United States Patent [19]

Morisaki

[11] 3,864,835
[45] Feb. 11, 1975

[54] DEVICE FOR MEASURING THE INTERFERENCES AND THE INCLINATIONS OF ABUTTING SURFACES OF A HALF PLAIN BEARING

[75] Inventor: Nobukazu Morisaki, Aichi-ken, Japan

[73] Assignee: Daido Metal Company, Ltd., Kita-ku, Nagoya, Japan

[22] Filed: June 6, 1974

[21] Appl. No.: 477,049

[52] U.S. Cl............................ 33/174 E, 33/180 AT
[51] Int. Cl. .............................................. G01b 3/56
[58] Field of Search .......... 33/174 R, 174 E, 174 H, 33/180 AT, 169 R, 169 B, 147 R

[56] References Cited
UNITED STATES PATENTS
2,551,471  5/1951  Snow.................................. 33/174 E Primary Examiner—Richard E. Aegerter
Assistant Examiner—Willis Little
Attorney, Agent, or Firm—Karl W. Flocks

[57] ABSTRACT

A measuring device capable of measuring simultaneously the average interferences and the inclinations of abutting surfaces of a bearing half piece of a half plain bearing, which is adapted to place said bearing half piece of the half plain bearing in a bearing half piece supporting body, to apply a load to said bearing half piece so that one abutting surface is compressed, and to measure said average interferences and said inclinations of abutting surfaces using a pair of dimension measuring instruments.

10 Claims, 11 Drawing Figures

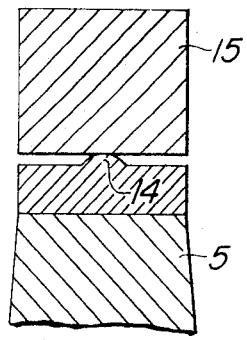
FIG. 7
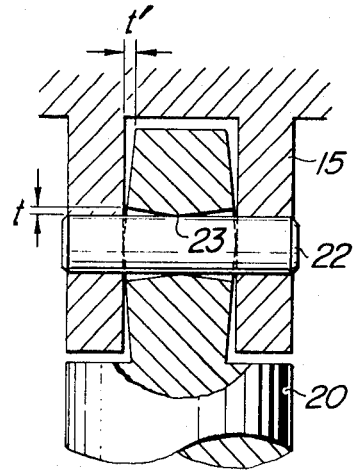
FIG. 8
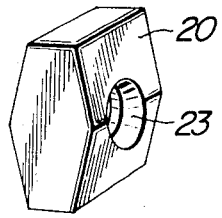
FIG. 9
FIG. 11 PRIOR ART
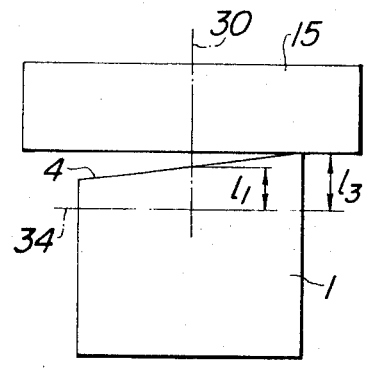
FIG. 10
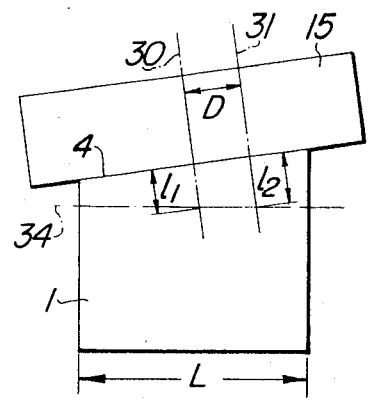

DEVICE FOR MEASURING THE INTERFERENCES AND THE INCLINATIONS OF ABUTTING SURFACES OF A HALF PLAIN BEARING

The present invention relates to a measuring device adapted to measure simultaneously the interferences of a half plain bearing and the inclinations of abutting surfaces of said half plain bearing.

Commonly, a half plain bearing is formed in the shape of a cylinder divided into two parts as shown in FIGS. 1 through 3. Bearing half pieces of a half plain bearing indicated by the numerals 1 are placed in bearing half piece cases 2 and 3, and the bearing half piece cases 2 and 3 are joined together so that a complete plain bearing is assembled. When joining the bearing half piece cases 2 and 3 together, abutting surfaces 4 are brought into abutting relations against corresponding ones to form a complete bearing. At the time of assembly, the bearing half pieces 1 must be force fitted in the bearing half piece cases 2 and 3. For attaining this end, when the bearing half pieces 1 are placed in the bearing half piece cases 2 and 3 to undergo a force fitting operation, the four radial ends of the bearing half pieces 1, i.e., the abutting surfaces of the bearing half pieces 1, project from the bearing half piece cases 2 and 3 at a distance forming the interference e as shown in FIG. 1. During the force fitting operation, the bearing half pieces 1 are compressed by the amounts of the interferences, and upon completion the assembly they are securely fixed in the bearing half piece cases 2 and 3 as FIG. 2 illustrates. Although it is desirable that the circumferential length of the interference be constant in the axial direction of the bearing half piece 1, in the actual products a strict attainment of this purpose is impossible. In all cases, the abutting surfaces are more or less inclined in relation to the edges of the bearing half piece case as viewed from the side of the bearing half piece case. Referring to FIG. 3, in the actual products, the center line $f$ of the back surface of the bearing half piece 1 is not parallel to the abutting surfaces 4. Since it is very difficult to machine the abutting surfaces 4 shown in the figure as planes $g$ parallel to the center line $f$, the planes $g$ are inclined in relation to the center line $f$. Hereafter these inclinations are referred to as "the inclinations of abutting surfaces." It will be readily understood that, if the inclinations of abutting surfaces are present, the bearing half piece 1 is subjected to an uneven compression, so that the bearing half piece 1 is fixed in the bearing half piece case in an incomplete manner, and an assembled plain bearing cannot have a true cylindrical shape. However, it is impossible to manufacture a bearing having no inclinations of abutting surfaces. For this reason, heretofore efforts have been made to hold the inclinations of abutting surfaces within given maximum tolerances.

When manufacturing a precision bearing, the measurement of the interferences and the inclinations of abutting surfaces plays a very important role. However, the prior art has not provided a device capable of measuring properly the interferences and the inclinations of abutting surfaces. Thus, an object of the present invention is to provide a measuring device adapted to be capable of measuring simultaneously the interferences and the inclinations of abutting surfaces of a bearing. Another object of the present invention is to provide a very simple and useful measuring device for measuring simultaneously the interferences and the inclinations of abutting surfaces of a bearing.

These objects and features of the present invention will become more clear by the following description of a preferred embodiment taking reference with the attached drawings, in which:

FIG. 7 is a sectional view taken along the line VII—VII of FIG. 6;

FIG. 8 is a sectional view taken along the line VIII—VIII of FIG. 6;

FIG. 9 is a perspective view showing the upper end of a piston shaft;

FIG. 10 is a view explaining the operation of the measuring device according to the present invention; and FIG. 11 is a view explaining the operation of a conventional device for measuring the interferences of a half plain bearing.

Hereunder an embodiment of the present invention will be explained with reference to the attached drawings.

Figure 4:
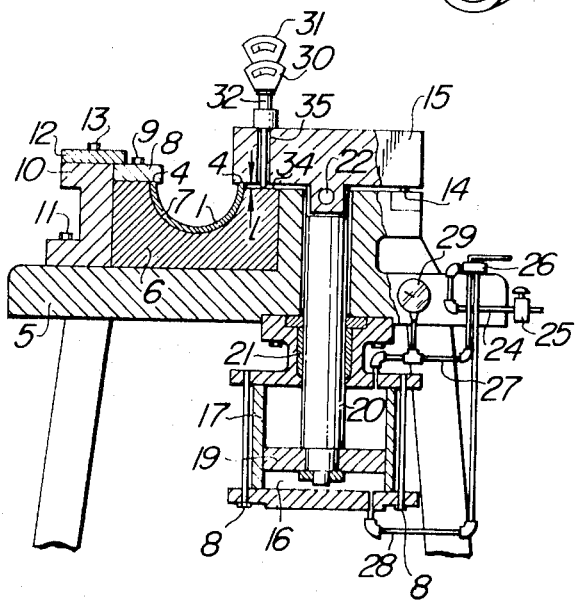
FIG. 4 is a partly sectional front view illustrating an embodiment of the measuring device according to the present invention which measures the interferences and the inclinations of abutting surfaces of a half plain bearing.
Figure 5:
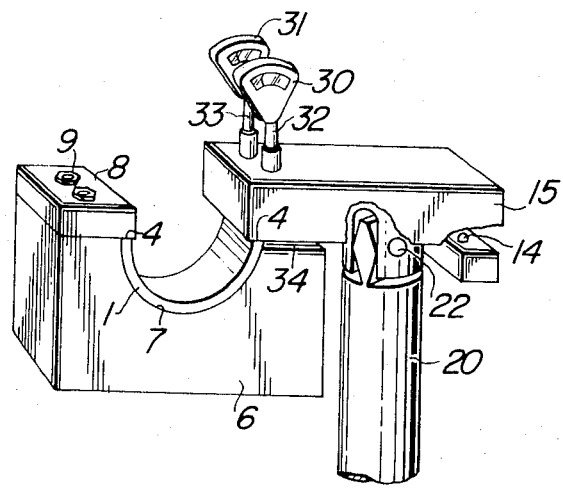
FIG. 5 is a perspective view showing the important part of said embodiment of the measuring device according to the present invention.
Figure 6:
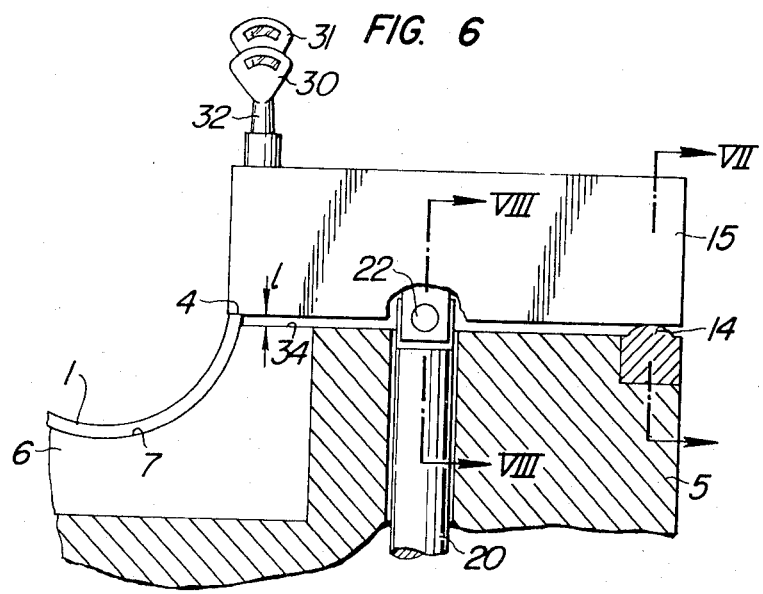
FIG. 6 is a partly sectional front view illustrating the important part of said embodiment of the measuring device according to the present invention.

Referring to FIGS. 4 through 6, the measuring device according to the present invention comprises a supporting bed 5 on which is provided a bearing half piece supporting body 6 having a concave surface 7. The concave surface 7 is identical in the curvature thereof with the previously described bearing half piece cases 2 and 3 and is adapted to receive a bearing half piece 1. On one side of the bearing half piece supporting body 6 there is fixed a stopper 8 by means of bolts 9. This stopper 8 is adapted to be engaged by one abutting surface 4 of said bearing half piece 1. Since the bearing half piece supporting bodies 6 of various sizes are used depending on the size of the bearing half piece 1, a fixing member 10 is provided so that bolts 11 are unscrewed and the bearing half piece supporting body 6 is moved to either left or right as viewed in the figure to be fixed at a desired position. A fastening plate 12 is attached to the upper end surface of the fixing member 10 by bolts 13 for fixing in a pressing manner the bearing half piece supporting body 6 with the stopper 8 being interposed between the fastening plate 12 and the bearing half piece supporting body 6. As shown also in FIGS. 6 and 7, a pressing member 15 is provided such that one end of the pressing member 15 is supported on a fulcrum 14 projecting from said supporting bed 5 to be able to swing to any desired angle in all directions, and the other end of the pressing member 15 presses the abutting surface 4 of said bearing half piece 1 which is not engaging the stopper 8. The numeral 16 indicates a loading means having a construction as will be described below.

The loading means 16 comprises a cylinder 17 fixed securely to said supporting bed 5 by means of bolts 18, and the cylinder 17 has therein a slidable piston 19. A piston shaft 20 securely fixed to the piston 19 extends through said cylinder 17 in an air-tight manner with a packing 21 being arranged therebetween. The piston shaft 20 further extends through said supporting bed 5 to be connected to the pressing member 15 by a pin 22. As shown detailedly in FIGS. 8 and 9, a hole 23 in the piston shaft 20 through which the pin 22 extends, is reduced in diameter at the central part thereof, so that the radii of the hole 23 at the both ends thereof are larger than the radius of the hole 23 at the central part thereof by a distance $t$. Moreover, the two vertical contacting surfaces of the connecting portion of the piston shaft 20 inserted into the receiving bracket portion of the pressing member 15, are inclined in relation to the vertical toward the ends in the vertical direction thereof starting at the central parts thereof in such a manner as to form a tapered body, so that the ends in the vertical direction of these inclined vertical contacting surfaces are each placed apart from the vertical by a distance $t'$. Thanks to this construction, the pressing member 15 can not only rotate about the pin 22 but also incline in a direction at right angles to the plane of said rotation. Needless to say, the construction of the connecting portion between the piston shaft 20 and the pressing member 15 should not be interpreted as being limited to the construction described above. The piston shaft 20 and the pressing member 15 are connected together through a joint means, and with the downward movement of the piston shaft 20 the pressing member 15 acts to press the abutting surface 4 engaged by the pressing member 15. Said joint means is adapted to swing the pressing member 15 about two straight lines crossing at right angles to each other on a horizontal plane, so that the pressing member 15 comes into full contact with said abutting surface 4 and press said abutting surface 4 while inclining in accordance with the inclination of said abutting surface 4. If these operational results are obtained in a proper manner, any type of construction may be employed. As examples of such a joint means, there may be enumerated a pin joint in which rings are crossed to form a connection or a connection is adapted to have suitable amounts of plays, a joint in which a pressing member 15 and a piston shaft 20 are connected together by means of a flexible wire or chain, and the like. Those skilled in the art may employ any of these joint means at will.

Compressed air is supplied to the device through a pipe 24 connected to a compressed air source (not shown) and through a pressure regulating valve 25. The numeral 26 designates a change-over valve adapted to selectively supply the compressed air to the upper and lower portions of said cylinder 17 through pipes 27 and 28, and also adapted to be capable of shutting out any one or both of said upper and lower portions of the cylinder 17 from the supply of compressed air. Said pipe 27 has a pressure gauge 29 which indicates the pressure applied to the pressing member 15 by said piston shaft 20 when the compressed air is supplied through the pipe 27. A pair of dial gauges 30 and 31 are supported by supports 32 and 33 on said pressing member 15. A probe of the dial gauge 30 extends through a through hole 35 piercing the pressing member 15 and is in contact with a contacting surface 34 of the bearing half piece supporting body 6. The dial gauge 30 is disposed substantially on the normal at the center of the length L of the bearing half piece 1 and in close vicinity to the abutting surface 4 (refer to FIG. 10). The dial gauge 31 is arranged at a position spaced a give distance, e.g., 20 mm., from the dial gauge 30 in the axial direction of the bearing half piece 1, and a probe of the dial gauge 31 is in contact with said contacting surface 34.

Figure 1:
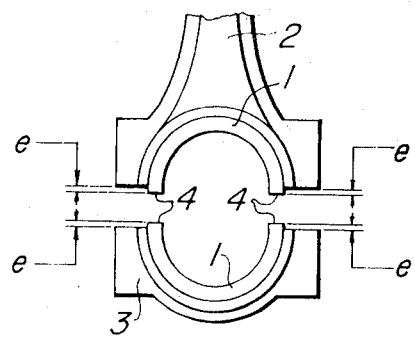
FIGS. 1 and 2 are explanatory views showing the interferences of a half plain bearing.
Figure 2:
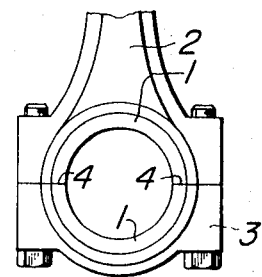
Figure 3:
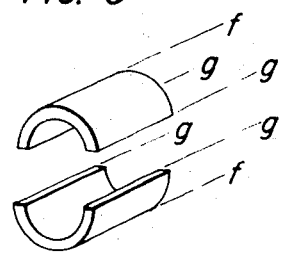
FIG. 3 is a view explaining the inclinations of abutting surfaces of the half plain bearing.

When measuring the interferences and the inclinations of abutting surfaces of the bearing half piece 1 with the use of the measuring device having the construction described above, a load of a given amount, e.g., 1 ton, is applied to the pressing member 15 by the loading means 16, so that the bearing half piece 1 is placed under a compressing force. At the start of the measuring operation, the measured value of the interference of the bearing half piece 1 is substantially twice the value $e$ indicated in FIG. 1. This initial measured value of the interference gradually decreases with the movement of the loading means 16. The pressure regulating valve 25 is adjusted to admit the compressed air into the cylinder portion above the piston 19, so that the load indicated on the pressure gauge 29 reaches a given value. As the pressing action of the pressing member 15 on the bearing half piece 1 is continued, the pressing member 15 begins to incline along the abutting surface 4 of the bearing half piece 1 and finally stops moving when it reaches the state shown in FIG. 10. When this state has been established, the interferences $l_1$ and $l_2$ are read from the dial gauges 30 and 31. In this case, the value $l_1$ is an average interference because the dial gauge 30 is provided substantially on the normal at the center of the length L of the bearing half piece as described previously. The inclination of an abutting surface is the difference between the interferences at the two ends in the axial direction of the bearing half piece 1, which is obtained using the following equation:

Inclination of an abutting surface = $(l_2 - l_1) \times L/D$ where D is the distance between the dial gauges 30 and 31, and L is the length of the bearing half piece 1. Whether or not the bearing half piece 1 is acceptable as a product can be decided by checking whether or not the average interference and the inclination of an abutting surface are within given tolerances. When performing such measurements, it is necessary to set zero points for the dial gauges 30 and 31. The setting of these zero points are done in the manner described below. If the interference corresponding to a given load, e.g., 0.05 mm., is known, before the bearing half piece 1 is put in the measuring device, a clearance gauge having a thickness equivalent to said known interference (not shown) is placed on the contacting surface 34, and the pressing member 15 is brought into contact with this clearance gauge with said given load being applied to the clearance gauge. In this state, the readings on the dial gauges 30 and 31 are taken as zero points. When the interference of a bearing half piece 1 is measured, the final value can be obtained by computing the difference between the indicated value and these zero point values.

Heretofore, there has been in use a device for measuring the interferences of a half plain bearing which was devised by the present inventor. However, this measuring device can measure only the maximum interference $l_3$ when the abutting surface being checked is inclined, as illustrated in FIG. 11. Needless to say, there is a fairly large difference between the maximum interference $l_3$ and the average interference $l_1$. However, the users of this measuring device have been forced to be satisfied with this result. Furthermore, this measuring device is not able to measure the inclination of an abutting surface.

As has been described in the foregoing, thanks to the use of the pressing member 15 capable of inclining in all directions and the pair of dial gauges 30 and 31, the present invention enjoys an outstanding advantage that by inclining the pressing member 15 along the abutting surface 4 of the bearing half piece 1, the average interference and the inclination of the abutting surface can be obtained simultaneously, accomplishing a more accurate and speedy measurement of the bearing half piece 1.

The present invention boasts another distinguishing advantage that it has a very simple construction.

In the present invention, the loading means 16 using compressed air may alternatively use another power such as hydraulic pressure and the like. Further, instead of being disposed on the normal at the center of the length L of the bearing half piece 1, the dial gauge 30 may be located at a position symmetrical with the dial gauge 31 as viewed from said normal, so that an average interference is obtained by averaging the readings of the dial gauges 30 and 31. Even if these modifications are employed, needless to say, the results substantially the same as those of the above embodiment can be achieved.

I claim:

1. A device for measuring the interferences and the inclinations of abutting surfaces of a half plain bearing comprising a bearing half piece supporting body having a receiving surface identical with the bearing half piece case of said half plain bearing and adapted to receive a bearing half piece of said half plain bearing, a supporting bed adapted to fix and support said bearing half piece supporting body, a stopper means which is provided on said bearing half piece supporting body and engages one abutting surface of said bearing half piece received on said receiving surface so that said one abutting surface is placed in a fixed positional relation with said bearing half piece supporting body, an abutting surface pressing means arranges such that said abutting surface pressing means is supported at one point thereon by a fulcrum means disposed on said supporting bed and extends over the other abutting surface of said bearing half piece to be in contact with and supported by said other abutting surface, a loading means having a piston shaft and adapted to apply a load to said abutting surface pressing means in which the end of said piston shaft is connected to said pressing means through a joint means which makes said pressing means swingable about each of two straight lines crossing at right angles to each other on a horizontal plane and which is adapted to operate in such a manner that with the movement of said piston shaft the portion of said pressing means extending over said other abutting surface comes into full contact with said other abutting surface and apply the load to said other abutting surface to compress said other abutting surface while inclining in accordance with the inclination of said other abutting surface, and a pair of dimension measuring instruments which are provided on said abutting surface pressing means and are adapted to measure the interference of said bearing half piece at their measuring positions spaced from each other in the axial direction of said bearing half piece.

2. A measuring device in accordance with claim 1 in which said joint means is so constructed that said joint means is adapted to be connected to said pressing means through a pin extending through a hole provided in the end of said piston shaft, said hole is bored such that the diameter of said hole is small at the central part of said hole and becomes progressively larger toward the both ends of said hole, and said end of said piston shaft has plays to prevent the interference with said pressing means so that said pressing means can swing about said pin and about an axis at right angles to said pin.

3. A measuring device in accordance with claim 1 in which said supporting bed includes a fixing means for fixing said bearing half piece supporting body to said supporting bed, and said fixing means is adapted to be capable of taking in relation to said supporting bed various fixing positions corresponding to various bearing half pieces supporting bodies so that the various bearing half piece supporting bodies are fixed on said supporting bed.

4. A measuring device in accordance with claim 1 in which said loading means includes a piston and a cylinder, said loading means further includes an air supply pipe or a hydraulic pressure supply pipe for operating said piston and a pressure gauge arranged on said supply pipe, and said pressure gauge is adapted to indicate the load applied to said abutting surface pressing means.

5. A measuring device in accordance with claim 1 in which each of said pair of dimension measuring instruments consists of a dial gauge, and probes of said dial gauges are adapted to extend through their respective through holes provided in said pressing means for coming into contact with said bearing half piece supporting body at positions in the vicinity of said other abutting surface.

6. A measuring device in accordance with claim 1 in which one dimension measuring instrument of said pair of dimension measuring instruments is provided substantially on the normal at the center of the length of said bearing half piece, and said other dimension measuring instrument is adapted to measure the average interference.

7. A measuring device in accordance with claim 1 in which said pair of dimension measuring instruments are provided substantially at positions symmetrical with each other as viewed from the normal at the center of the length of said bearing half piece.

8. A measuring device in accordance with claim 1 in which said joint means consists of a semicircular ring with a circular section provided on said pressing means and a semicircular ring with a circular section which is adapted to cross said first-mentioned semi-circular ring and is provided on said end of said piston shaft.

9. A measuring device in accordance with claim 2 in which said abutting surface pressing means has two brackets adapted to support said pin at the both ends of said pin, said hole provided in said end of said piston shaft is adapted to engage said pin between said two brackets, and said end of said piston shaft has tapered portions to prevent the interference with said brackets so that said pressing means can swing about an axis at right angles to said pin.

10. A measuring device in accordance with claim 3 in which said supporting bed has a wall means to be in contact with a side of said bearing half piece supporting body, said fixing means includes a fixing member which is adapted to engage the other side of said bearing half piece supporting body for fixing said bearing half piece supporting body to said supporting bed in cooperation with said wall means and is adjustable in relation to said supporting bed, and said fixing means further has a fastening means for maintaining said stopper means in a fixed positional relation with said fixing means.

* * * * *